US012139953B2

(12) United States Patent
David

(10) Patent No.: US 12,139,953 B2
(45) Date of Patent: Nov. 12, 2024

(54) PNEUMATIC FARE GATE

(71) Applicant: Garcia C. David, Oakland, CA (US)

(72) Inventor: Garcia C. David, Oakland, CA (US)

(73) Assignee: San Francisco Bay Area Rapid Transit District, Oakland, CA (US)

( * ) Notice: Subject to any disclaimer, the term of this patent is extended or adjusted under 35 U.S.C. 154(b) by 0 days.

(21) Appl. No.: 17/735,315

(22) Filed: May 3, 2022

(65) Prior Publication Data

US 2022/0356659 A1 Nov. 10, 2022

Related U.S. Application Data

(60) Provisional application No. 63/183,922, filed on May 4, 2021.

(51) Int. Cl.

| | |
|---|---|
| ***E05F 15/54*** | (2015.01) |
| ***E01F 13/04*** | (2006.01) |
| ***E05F 1/06*** | (2006.01) |
| ***E06B 11/02*** | (2006.01) |
| ***F15B 15/14*** | (2006.01) |
| ***F15B 15/20*** | (2006.01) |

(52) U.S. Cl.

CPC ............ *E05F 15/54* (2015.01); *E01F 13/046* (2013.01); *E05F 1/066* (2013.01); *E06B 11/02* (2013.01); *F15B 15/1447* (2013.01); *F15B 15/20* (2013.01); *E05Y 2900/40* (2013.01)

(58) Field of Classification Search

CPC ......... E05F 15/54; E05F 15/614; E05F 1/066; E05F 1/065; F15B 15/1447; F15B 15/20

See application file for complete search history.

(56) References Cited

U.S. PATENT DOCUMENTS

| | | | | |
|---|---|---|---|---|
| 4,472,908 A * | 9/1984 | Wanzl | E05F 15/614 | 49/141 |
| 4,665,650 A * | 5/1987 | Hall | E05F 15/614 | 74/567 |
| 5,035,082 A * | 7/1991 | Butler | E01F 13/06 | 49/381 |
| 5,050,344 A * | 9/1991 | Skeem | E05F 1/066 | 49/245 |
| 5,136,810 A * | 8/1992 | DeWitt, III | E01F 13/06 | 49/141 |
| 5,180,121 A * | 1/1993 | Banks | E05F 15/72 | 49/237 |
| 5,869,940 A * | 2/1999 | Parsadayan | E05F 15/622 | 318/568.14 |
| 6,928,699 B2 * | 8/2005 | Sawa | E05F 3/20 | 16/314 |
| 7,155,779 B2 * | 1/2007 | Watkins | E05F 15/54 | 16/316 |

(Continued)

FOREIGN PATENT DOCUMENTS

EP 0581982 A1 * 2/1994 .............. E05F 15/04

OTHER PUBLICATIONS

English translation of EP-0581982 (Year: N/A).*

*Primary Examiner* — Justin B Rephann

(74) *Attorney, Agent, or Firm* — Brothers Smith LLP; Leopold Lueddemann

(57) ABSTRACT

A pneumatic drive mechanism for converting linear motion from compressed air into rotational motion for use in fare gates and other applications.

8 Claims, 5 Drawing Sheets

(56) References Cited

U.S. PATENT DOCUMENTS

| | | | | |
|---|---|---|---|---|
| 7,367,161 | B1 * | 5/2008 | Jones | E05F 15/614 49/334 |
| 7,958,675 | B2 * | 6/2011 | Stull | E06B 11/02 256/73 |
| 8,112,938 | B2 * | 2/2012 | Bolduc | E06B 11/085 49/141 |
| 8,291,643 | B2 * | 10/2012 | Stull | E06B 11/02 49/390 |
| 8,296,998 | B2 * | 10/2012 | Stull | E06B 11/02 49/333 |
| 8,341,888 | B2 * | 1/2013 | Stull | E05F 15/614 49/237 |
| 9,145,724 | B2 * | 9/2015 | Dudley | E05F 3/08 |
| 2008/0307709 | A1 * | 12/2008 | Stull | E05D 15/54 49/358 |
| 2010/0263285 | A1 * | 10/2010 | Stull | E05F 15/614 49/358 |
| 2011/0214354 | A1 * | 9/2011 | Talpe | E05F 3/14 74/29 |
| 2012/0222356 | A1 * | 9/2012 | Beck | B60K 15/05 49/348 |
| 2013/0199094 | A1 * | 8/2013 | Lachance | E05B 47/023 49/31 |
| 2015/0191955 | A1 * | 7/2015 | Dudley | E05F 3/08 49/386 |

* cited by examiner

PNEUMATIC FARE GATE

CROSS REFERENCE TO RELATED APPLICATIONS

This application claims the benefit of U.S. Provisional Patent Application No. 63/183,922, filed May 4, 2021, entitled "Pneumatic Fare Gate", the disclosure of which is incorporated by reference herein in its entirety.

FIELD OF THE INVENTION

The disclosed embodiments relate generally to a pneumatic drive mechanism for converting linear motion from compressed air into rotational motion for use in fare gates and other applications.

BACKGROUND OF THE INVENTION

Existing infrastructure of fare gate devices typically uses compressed air to operate existing fare gates and linear pneumatic actuators to drive the barriers. One of the most common fare gates utilizes bi-parting barriers that are approximately maximum height of three-feet from the floor and are not designed to lock in the closed position. As a result, patrons can easily jump over the barriers or push them open as a form of fare evasion. In light of lost revenue due to fare evasion (theft) each year, one is likely to ask why new gates are not installed to prevent the theft. The answer lies in the existing pneumatically driven fare gates.

In efforts to address fare evasion, changes to the existing fare gate design have been made to a swing gate design to make it more difficult for patrons to jump over or push through the fare gates. The swing barrier improves on the existing fare gates to dissuade fare evasion since barrier dimensions can be selected to make jumping over or crawling under the fare gates more difficult, and can also be locked to prevent patrons from pushing through the gates, while being capable of maintaining smooth and quick operational functions. However, these swing barrier-type fare gates use an electric motor to drive the barriers, as the required motions are generally not supported by pneumatic driven gearing. Electric driven fare gates (at Bay Area Rapid Transit District) historically have suffered from poor reliability due to problems associated with the electric drivers. No pneumatic swing gate mechanism is used or available commercially.

Pneumatically driven fare gates tend to be more reliable and durable than electric driven fare gates, so there is a cost incentive and time benefit of utilizing existing infrastructure/utilities for fare gates. The change to generally less reliable electric gates includes the cost and installation of the new gates as well as the loss in revenue from repairs, delays, and resulting customer attrition, thus keeping the existing bi-parting barriers, despite pervasive fare evasion has been the preferred option.

SUMMARY OF THE INVENTION

The invention is a pneumatic drive mechanism which converts linear shaft motion to rotational shaft motion along a common axis when compressed air is applied to a three-position linear actuator. The benefits of retrofitting existing fare gates to pneumatic swing gates includes time, cost, and the ability to use existing infrastructure (for example, compressed air, power, communication, and banking systems associated with existing fare gates).

The main shaft of a plurality-position linear actuator is connected to non-rotating spline shaft which carries a pair of Cam-Followers. The preferred embodiment has a three-position linear actuator. The Cam-Followers are guided by a helical cam shaft that is supported by bearings and is free to rotate around a common axis as the cam-followers travel up and down along the common axis. This mechanism can be used to convert existing fare gates to swing barrier type fare gates.

The pneumatic drive mechanism provides a simple, curable, reliable, heavy duty, user safe, easily maintainable, high performance, and scalable driver mechanism for controlling a 180-degree movement of a swing type object or barrier. When coupled with the appropriate pneumatic controls and processing logic, the device can operate in a proportional integral derivative ("PID") mode capable of sophisticated control and performance of its connected barrier or load. A PID controller is an instrument used to automate control and correction of a function such as temperature control of heating/cooling systems, or cruise control in an automobile, as examples.

BRIEF DESCRIPTION OF THE DRAWINGS

The aspects mentioned herein, as well as other features, aspects, and advantages of the present technology will now be described in connection with various embodiments, with reference to the accompanying drawings. The illustrated embodiments, however, are merely examples and are not intended to be limitation. Like reference numbers and designations in the various drawings indicate like elements.

DETAILED DESCRIPTION OF THE INVENTION

Figure 1:
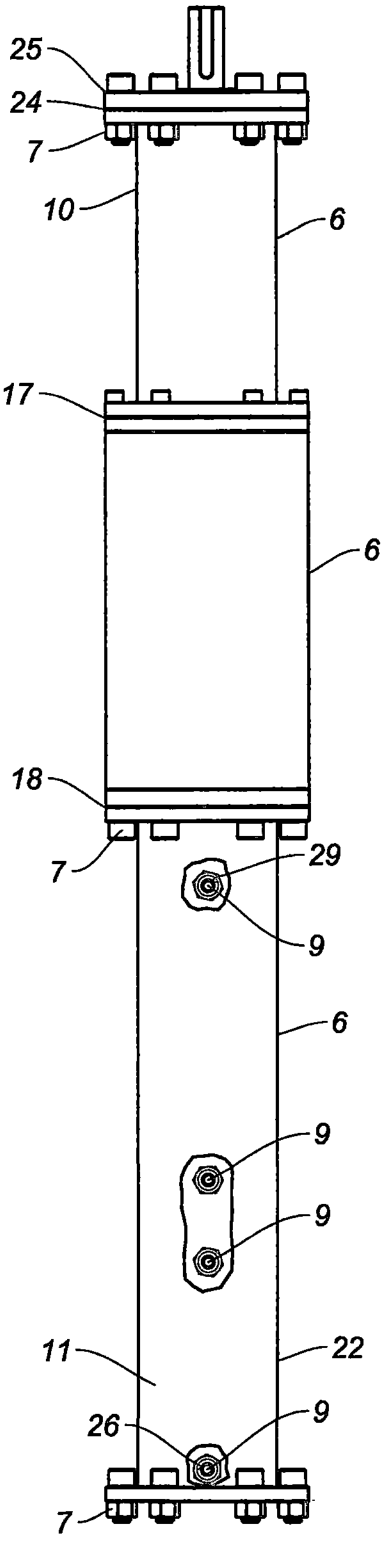
FIG. 1. illustrates a view of the external configuration of one embodiment.

Powered by compressed air, the invention converts linear shaft motion to rotational shaft motion along a common axis. The mechanism is designed to have an output shaft rotation range and can stop at a plurality of predetermined positions. The preferred embodiment has an output shaft rotation range of 180 degrees and can stop at a three predetermined positions (0 deg, 90 deg, and 180 deg). The linear to rotation translation of the preferred embodiment is achieved by using a three-position linear pneumatic actuator (1), a spline shaft (2), ball spline bearing (sometimes called a spline shaft nut) (3), two sleeve bearings (3), a custom designed helical cam shaft (4), and cam followers (5). The two sleeve bearings (3) include an upper and lower sleeve bearing, specifically, each sleeve bearing includes a bearing housing, thereby comprising an upper bearing housing and helical cam shaft support bearing (16) and a lower bearing housing and helical cam shaft support bearing (15). Other embodiments may have more or less than said three positions. The components are assembled and supported by a metal housing (6), said metal housing having an upper end (21) and a lower end (22), using standard fasteners (7) to attach the parts of the metal housing and other items, as described herein. Dynamic and static forces are supported by said bearings (3). In the preferred embodiment, the assembly is actuated when compressed air is applied to one or more of the four ports (9) on the three-position actuator. (1) Based on the designed helical cam shaft orientation, the output barrier shaft (not shown) rotates counterclockwise when compressed air is supplied to the linear actuator port (9) to send the main piston (1) in the up direction, and clockwise when compressed air is supplied to send the main piston (1) in the down direction. In another embodiment, the rotational direction could also be achieved by reversing the helical slots (23) of the helical cam shaft orientation. Controlling rotational direction through pneumatic porting creates the necessary rotational control and minimizes part counts. Furthermore, due to the type of bearings used and assembly configuration, the rotational performance is symmetric in either rotation direction, i.e., the mass of the assembly has no apparent effect on direction of rotational performance.

Figure 2:
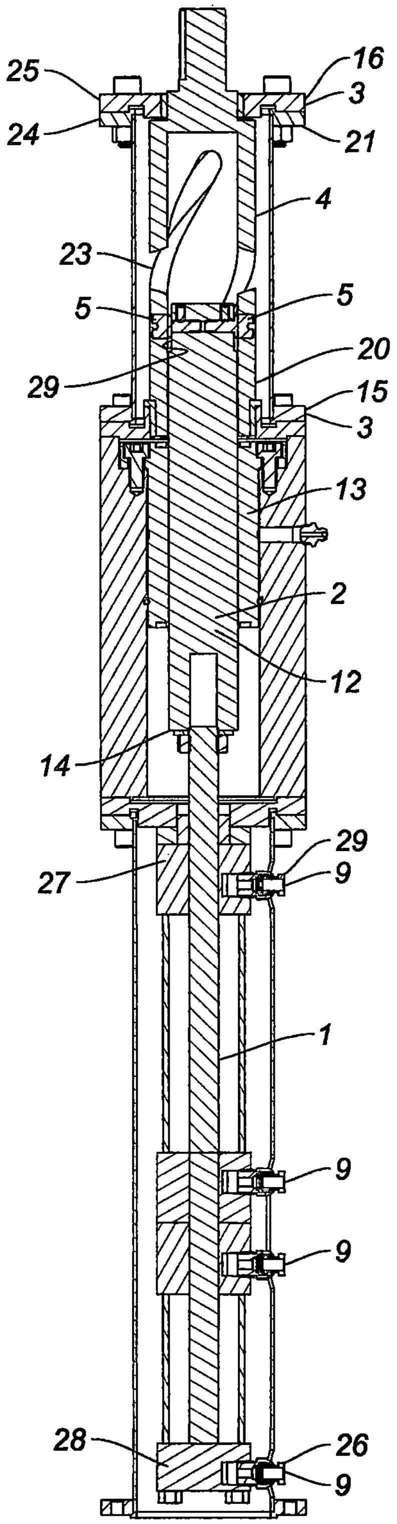
FIG. 2. illustrates a cross section view of one embodiment.

Now looking at FIG. 1 and FIG. 2, and in a preferred embodiment, the pneumatic drive mechanism comprises a spline shaft (12), said spline shaft housed within said cylindrical ball-spline bearing housing (6), said cylindrical ball-spline bearing housing having a first end (10) and an opposing second end (11), an upper middle portion (17) and a lower middle portion (18), said cylindrical ball-spline bearing housing further having a plurality of actuator pneumatic positions (9), said actuator pneumatic positions containing compressed air connection ports, said cylindrical ball-spline bearing housing (6) first end (10) connected to non-rotating spline shaft (2) by lower bearing housing (15), said non-rotating spline shaft having a first end (13) and a second end (14), said non-rotating spline shaft (2) containing a plurality of cam-followers (5). Said cylindrical ball-spline housing first end (10) is connected to a helical cam shaft (4), said connection between said ball-spline housing first end (10) and said helical slot cam shaft (4) being a lower bearing housing (15) and said helical cam shaft (4) second end (21) connected to said lower bearing housing and helical cam shaft bearing (15) at said upper middle portion (17) of said cylindrical shaft. (6)

Figure 3:
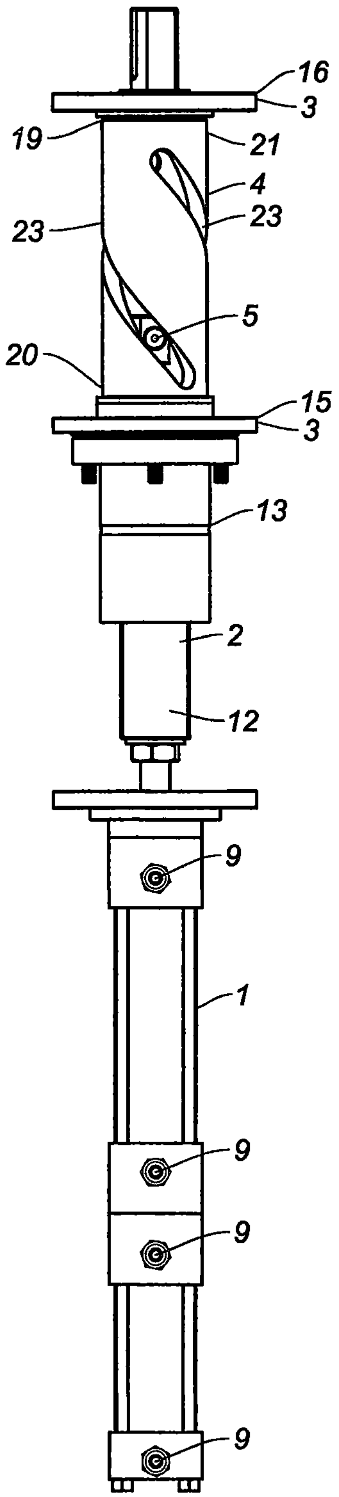
FIG. 3. illustrates a view of the internal configuration of one embodiment.

Now looking at FIG. 2 and FIG. 3, said helical cam shaft (4) with a first end (19) and a second end (20) of said helical cam shaft, said first end of said helical cam shaft (19) connected to said upper bearing housing and helical support bearing (16) for which said upper bearing housing and helical support bearing is attached to said metal housing (6) at said metal housing upper end. (21) Said helical cam shaft (4) containing a plurality of slot cams (23) in a general helical orientation, said cam followers (5) oriented in a manner to travel along said slot cams (23), said second end of said helical cam shaft (20) connected to an upper bearing housing assembly (16), said upper bearing housing assembly having a first end (24) and a second end (25), and said second end of said helical cam shaft (4) connected to said upper bearing housing assembly first end (24).

Figure 4:
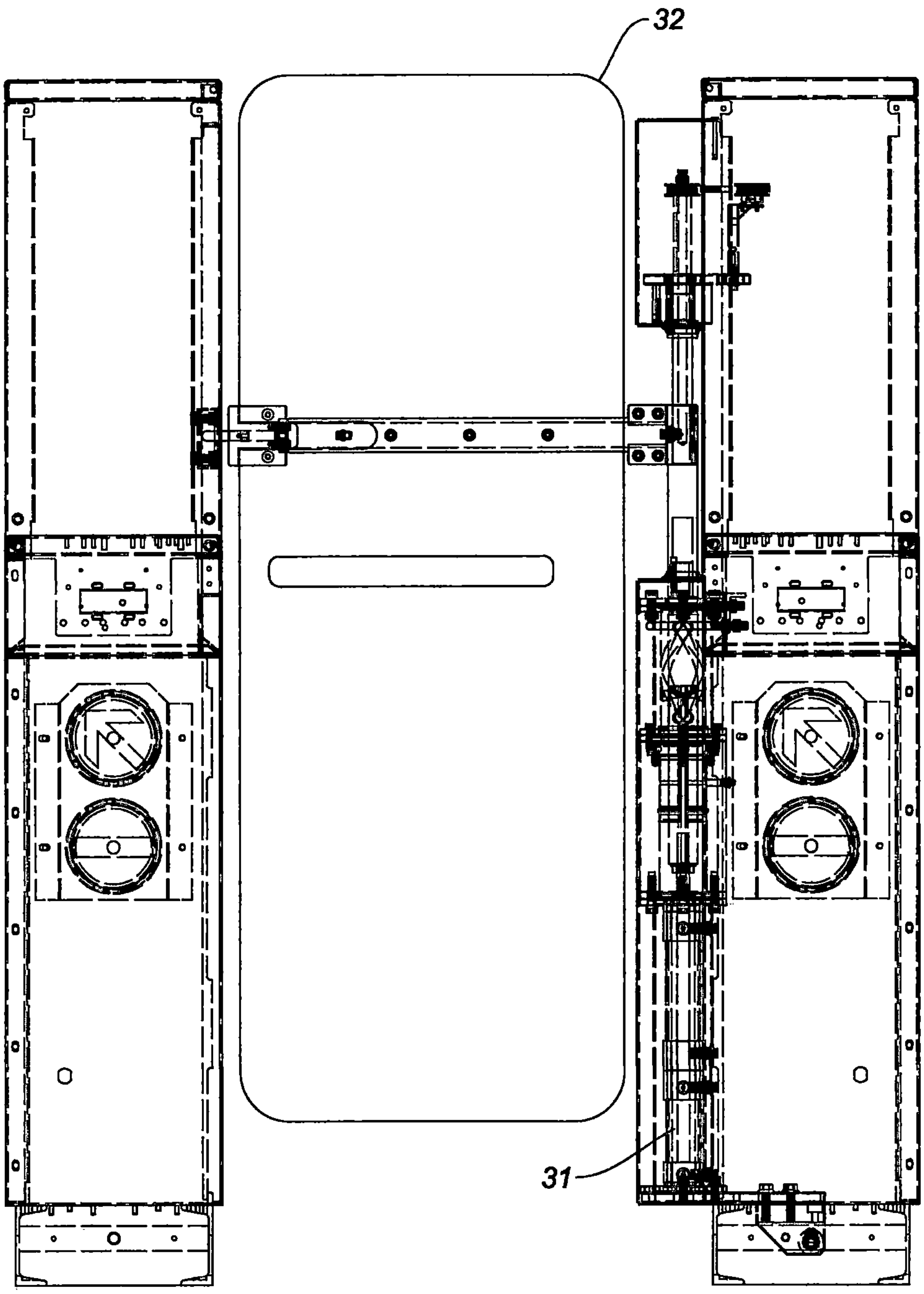
FIG. 4. illustrates a view of the Pneumatic Actuator Drive Assembly mounted inside a fare gate panel.
Figure 5:
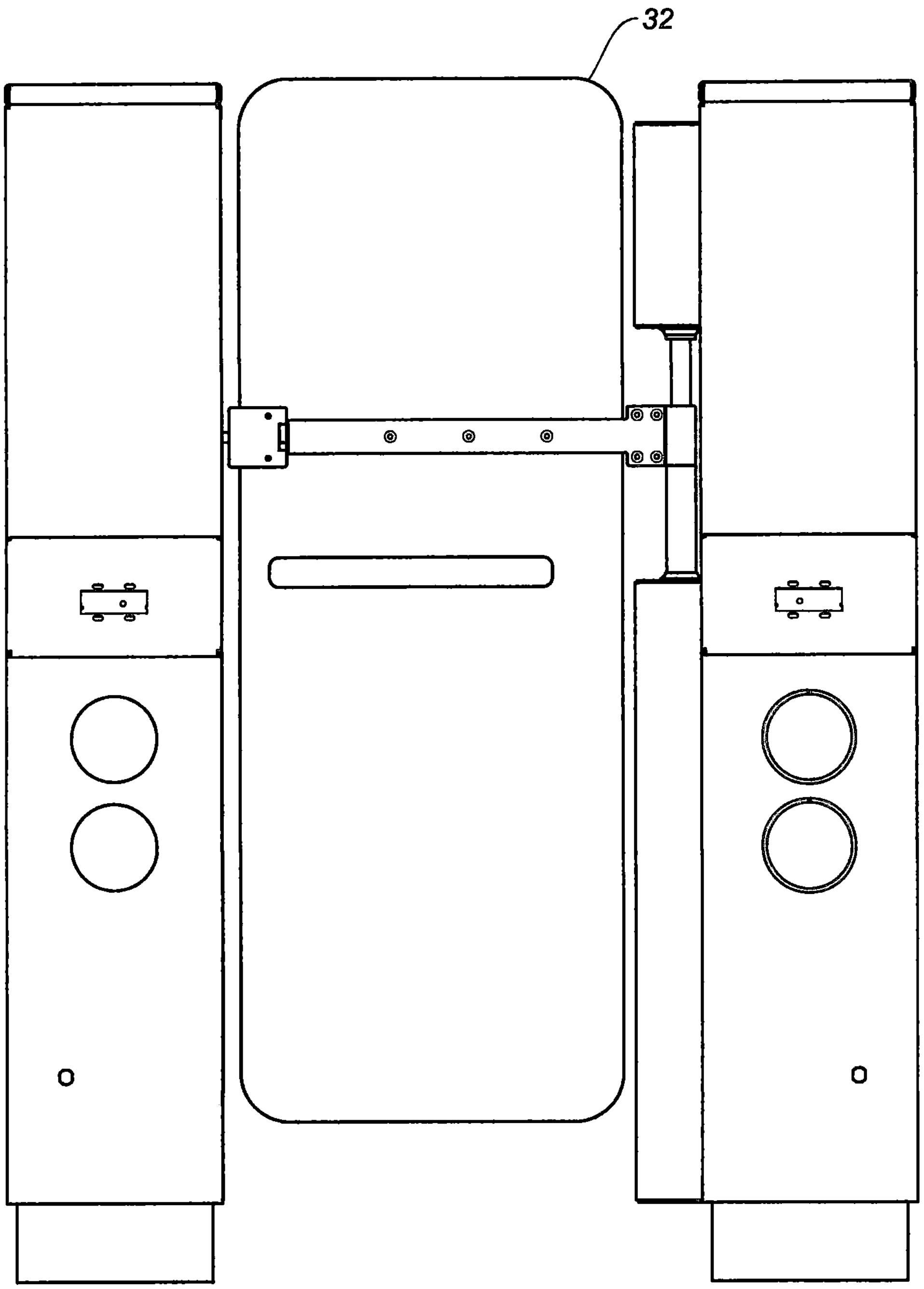
FIG. 5. Illustrates an outside view of a "swing barrier" style fare gate using the Pneumatic Actuator Drive Assembly to drive the barrier.

Now turning to FIG. 4 and FIG. 5, the preferred embodiment is assembled per the assembly drawing attached herein. The pneumatic drive assembly (31) has been successfully integrated into a retrofit conversion of existing fare gates (FIG. 4 and FIG. 5) but can be used in many different applications. The pneumatic drive assembly allows conversion of fare gate from a dual leaf bi-parting barrier type to a swinging leaf barrier type. (32) In one embodiment, said three-position actuator is what creates the three pneumatic positions. In another embodiment, the ball-spline housing (6) is what houses the ball spline bearing. (13) In yet another embodiment, the application of compressed air determines actuator extension. In another embodiment, the absence of compressed air determines the actuator retraction.

The pneumatic drive mechanism is assembled using both custom designed and commercially available components. To use the mechanism, compressed air is supplied to one or more of the four-ports (9) on the three-position actuator (1), said three position pneumatic actuator having an upper end (27) and a lower end. (28) The helical cam shaft (4) rotates counterclockwise when compressed air is supplied to the respective linear actuator port (26) at the lower end (28) to send the main piston (2) in the up direction, and clockwise when compressed air is supplied to the main piston (2) at an actuator port at said upper end (27) at the opposite end to send the main piston (2) in the down direction. The preferred embodiment is controlled by an electro-pneumatic circuit, an absolute rotary encoder, and a programmable logic controller (PLC) to meet specific fare gate functional requirements, although other embodiments may use alternative circuits and logic controllers. Although the pneumatic drive mechanism is currently used to create a swing-type barrier fare gate, it can be used in other applications where rotational control and positioning of an object is desired.

The device (pneumatic drive mechanism) is used to convert an existing fare gate with Bi-parting barriers to a swing gate. Specifically, in the preferred embodiment, the device is first mounted onto the base of a retrofitted fare gate console. A barrier shaft with a bore and keyway sized to fit the output shaft of the preferred embodiment is mounted and locked in place with a set screw. A barrier is attached to the barrier shaft. The opposite end of the barrier shaft is supported by a bearing to support radial loads and stabilize barrier rotation during operation. An absolute encoder is mounted within the fare gate console and is driven by a timing belt and pulley, which is driven from the barrier shaft as it rotates. The preferred embodiment is controlled by a Fare Gate Controller which consists of a Programmable Logic Controller (PLC), an electro-pneumatic circuit assembly, compressed air source, and an absolute encoder. After valid fare is processed within the existing fare gate, the PLC is programmed to receive and send command signals to directional control valves on the pneumatic circuit, which then directs regulated compressed air accordingly to the three-position actuator to either open or close the barrier. The absolute encoder sends feedback signals to the PLC so it can determine barrier position.

The design of the device allows for integration into the existing fare gate assemblies or into a variety of unique fare gate configurations, or other applications. Other uses for this invention include doors, gates, rotating tables, positioning equipment, various rotating equipment, and various driving or mechanical equipment.

In an embodiment, the pneumatic drive mechanism, comprises a main piston, said piston housed within a cylindrical housing, said cylindrical housing having a first end and an opposing second end, said cylindrical housing having a plurality of actuator pneumatic positions, said actuator pneumatic positions containing compressed air connection ports, said cylindrical housing first end connected to non-rotating spline shaft, said non-rotating spline shaft having a first end and a second end, said non-rotating spline shaft containing a plurality of cam-followers, said first end of said non-rotating spline shaft connected said first end of said cylindrical housing, said second end of said non-rotating spline shaft connected to a lower bearing housing assembly, said lower bearing housing assembly having a first end and a second end, said second end of said non-rotating spline shaft connected to said lower bearing housing assembly first end, said second end of said lower bearing housing assembly connected to a helical cam shaft, said helical cam shaft with a first end and a second end, said second end of said lower bearing housing assembly connected to said first end of said helical cam shaft, said helical cam shaft containing a plurality of slot cams in a general helical orientation, each said cam-follower oriented in a manner to travel along said slot cams, said second end of said helical cam shaft connected to an upper bearing housing assembly, said upper bearing housing assembly having a first end and a second end, and said second end of said helical cam shaft connected to said upper bearing housing assembly first end. In another embodiment, the pneumatic drive mechanism said cylindrical housing contains three actuator pneumatic positions. In yet another embodiment, said cylindrical housing contains four actuator pneumatic positions. In another embodiment, the application of compressed air determines actuator extension. In still yet another embodiment, the absence of compressed air determines the actuator retraction.

In another embodiment, the pneumatic drive mechanism, comprises a main piston, said piston housed within a cylindrical housing, said cylindrical housing having a first end and an opposing second end, said cylindrical housing having a plurality of actuator pneumatic positions, said actuator pneumatic positions containing compressed air connection ports, said cylindrical housing first end connected to non-rotating spline shaft, said non-rotating spline shaft having a first end and a second end, said non-rotating spline shaft containing a plurality of cam-followers, said first end of said non-rotating spline shaft connected said first end of said cylindrical housing, said second end of said non-rotating spline shaft connected to a lower bearing housing assembly, said lower bearing housing assembly having a first end and a second end, said second end of said non-rotating spline shaft connected to said lower bearing housing assembly first end, said second end of said lower bearing housing assembly connected to a helical cam shaft, said helical cam shaft with a first end and a second end, said second end of said lower bearing housing assembly connected to said first end of said helical cam shaft. said helical cam shaft containing a plurality of slot cams in a general helical orientation, each said cam-follower oriented in a manner to travel along said slot cams, said second end of said helical cam shaft connected to an upper bearing housing assembly, said upper bearing housing assembly having a first end and a second end, and said second end of said helical cam shaft connected to said upper bearing housing assembly first end. In still another embodiment, said pneumatic drive mechanism is mounted onto the base of a fare gate console to open and close a fare gate. In another embodiment, a barrier is attached to a barrier shaft and bearing to support radial loads and stabilize barrier rotation during operation. In still yet another embodiment, said pneumatic drive mechanism is connected to an electro-pneumatic circuit, an absolute rotary encoder, and a programmable logic controller ("PLC") and connected to a fare gate. In another embodiment, the embodiment of the preceding sentence further comprises said pneumatic drive mechanism is designed to receive signals for directional control valves on said pneumatic circuit, thereby designed to direct regulated compressed air to said actuator to either open or close said barrier and fare gate.

In another embodiment, some of the components may be combined into one component, such as making an actuator with an integrated spline shaft and bearing. In yet another embodiment, different types of bearings or actuators may be used for different applications, but the concept would still be the same.

The invention works on one common axis which saves space and minimizes footprint. Other devices can be built to rotate an object pneumatically by use of actuators, rack and pinion, shafts and gears etc., however, such device would contain multiple axes to function which presents challenges in adjustments and alignment to achieve long-term reliability and may require additional lubrication needs. Also, such device would create a larger footprint.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

I claim:

1. A pneumatic drive mechanism, comprising: A main piston, said piston housed within a cylindrical housing, said cylindrical housing having a first end and an opposing second end, said cylindrical housing having at least three pneumatic actuator positions, said actuator pneumatic positions containing compressed air connection ports, said cylindrical housing first end connected to non-rotating spline shaft, said non-rotating spline shaft having a first end and a second end, said non-rotating spline shaft containing a plurality of cam-followers, said first end of said non-rotating spline shaft connected to said first end of said cylindrical housing, said second end of said non-rotating spline shaft connected to a lower bearing housing assembly, said lower bearing housing assembly having a first end and a second end, said second end of said non-rotating spline shaft connected to said lower bearing housing assembly first end, said second end of said lower bearing housing assembly connected to a helical cam shaft, said helical cam shaft with a first end and a second end, said second end of said lower bearing housing assembly connected to said first end of said helical cam shaft said helical cam shaft containing a plurality of slot cams in a general helical orientation, each said cam-follower oriented in a manner to travel along said slot cams, said second end of said helical cam shaft connected to an upper bearing housing assembly, said upper bearing housing assembly having a first end and a second end, said second end of said helical cam shaft connected to said upper bearing housing assembly first end.

2. The pneumatic drive mechanism of claim 1, wherein said cylindrical housing contains four actuator pneumatic positions.

3. The pneumatic drive mechanism of claim 1, wherein the application of compressed air determines actuator extension.

4. The pneumatic drive mechanism of claim 1, wherein the absence of compressed air determines the actuator retraction.

5. The pneumatic drive mechanism of claim 1, wherein said pneumatic drive mechanism is mounted onto the base of a fare gate console to open and close a fare gate.

6. The pneumatic drive mechanism of claim 1, wherein a barrier is attached to a barrier shaft and bearing to support radial loads and stabilize barrier rotation during operation.

7. The pneumatic drive mechanism of claim 1, wherein said pneumatic drive mechanism is connected to an electro-pneumatic circuit, an absolute rotary encoder, and a programmable logic controller ("PLC") and connected to a fare gate.

8. The pneumatic drive mechanism of claim 7, wherein said pneumatic drive mechanism is designed to receive signals for directional control valves on said pneumatic circuit, thereby designed to direct regulated compressed air to said actuator to either open or close said barrier and fare gate.

* * * * *